T. CARROLL.
TREE-TRANSPLANTERS.
No. 181,820. Patented Sept. 5, 1876.
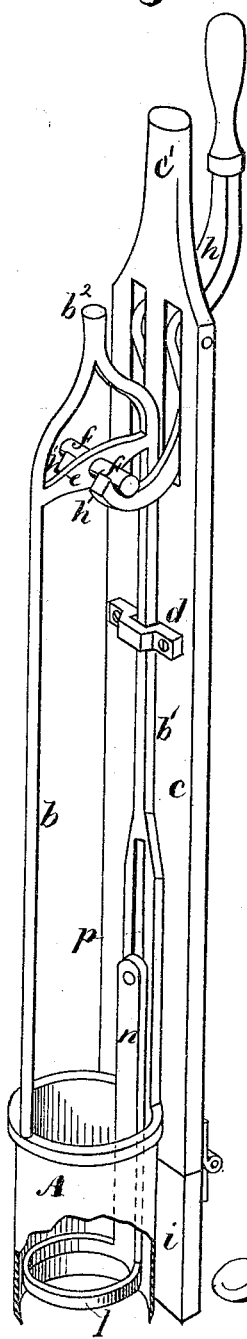
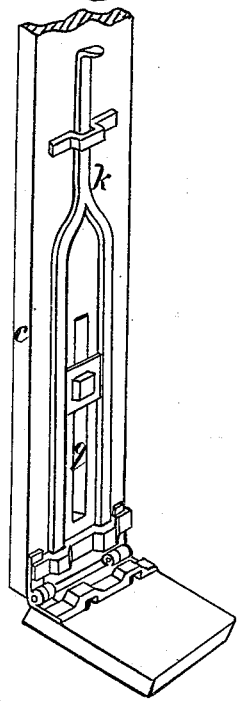
Witnesses
Geo. H. Strong
Jno. L. Bornes
Inventor
Timothy Carroll
by J. Dewey & Co.
Attys.

UNITED STATES PATENT OFFICE.

TIMOTHY CARROLL, OF ANAHEIM, CALIFORNIA.

IMPROVEMENT IN TREE-TRANSPLANTERS.

Specification forming part of Letters Patent No. 181,820, dated September 5, 1876; application filed June 21, 1876.

*To all whom it may concern:*

Be it known that I, TIMOTHY CARROLL, of Anaheim, Los Angeles county, State of California, have invented an Improved Apparatus for Transplanting Trees; and I do hereby declare the following description and accompanying drawings are sufficient to enable any person skilled in the art or science to which it most nearly appertains to make and use my said invention without further invention or experiment.

This invention relates to a novel device for transplanting young trees, shrubs, and the like; and it consists in connecting a vertically-moving tube and guide rod or rods with a frame, in such manner that the same may be operated by one person, for the purpose of taking up the tree to be transplanted, substantially as hereinafter more fully described; also, in a lever pivoted to said frame, and a loose ring arranged to slide within the tube, so that when the lever is operated and the tube raised the ring will remain stationary, and thereby force the tree from the tube into the hole prepared for its final reception; also, in a hinged piece at the lower end of the frame, which, during the operation of taking up the tree, is bolted in line with the frame, but which, after the tube and tree have been lowered into the hole prepared for the final reception of the tree, is unbolted and swung out of the way, in order that the frame may be lowered and the lever brought down, so as to raise the tube, all as hereinafter specified.

Let A represent the tubular case which is designed to be driven into the ground and around the roots of a tree to be transplanted, and $b$ $b^1$ vertical guide-rods, which, at their lower ends, are rigidly connected with said tubular case A, and at their upper ends united together to form a seat, $b^2$, which may be struck with a hammer in order to drive the tube A into the ground. One of these rods is arranged to slide upon a vertical back-frame, $c$, and it is maintained in position thereon by a guide-piece, $d$, so that the rods and tube shall, during operation, move in a plane parallel with the length of the said frame. At or near the upper junction of the rods $b$ $b^1$ I secure a cross-bar, $e$, which is provided with projecting side pins $ff$, and to the upper portion of the frame $c$ I pivot a lever, $h$, having a bifurcated end, so arranged that the prongs $h'$ shall strike against the pins $ff$ as the lever-handle is depressed, and, consequently, raise the rods and tubular case as far as may be found necessary during the operation of transplanting. To the lower end of the frame $c$ is hinged a piece, $i$, which during the process of raising a tree from the ground, is bolted and held in line with the frame by means of a bolt, $k$, but which, during the operation of replanting, is released and swung out at right angles, so as to shorten the distance between the base of the frame and the fulcrum-point of the lever, in order that the frame and lever may be lowered, so as to enable said lever to strike against the under side of pins $ff$, and thereby raise the tube. Within the tubular case A I arrange a ring, I, which is fitted to slide from end to end, and which serves as an ejector when it is desired to expel the ball of earth and tree to be replanted. This ring is limited in its upward movement as the tube is driven into the ground and filled with earth and roots by an interior collar or suitable stops in the upper end of the tube. It is also guided and prevented from dropping out of said tube by a guide-rod, $n$, which is connected therewith at its lower end, and guided by means of a sliding connection with the frame—such, for instance, as by means of a bolt, which works through slots $p$ $q$, formed in the rods $b^1$ and through the frame.

The manner of operating my apparatus will be as follows: The lever-handle is raised to a vertical position, the piece $i$ bolted into line with the frame, and the tubular case placed over a tree to be transplanted and lowered until it rests upon the ground. The tubular case A is then driven into the ground to a distance corresponding with the length of roots and quantity of earth to be removed with the same, the ring $l$ rising as the earth fills the tube and presses against it. The ball is then severed from the ground by a spade, or in any other convenient way. The tube with its contents is next lifted from the ground, and to facilitate this operation I provide a handle, $c'$, at the upper end of the frame, by means of which the frame may readily be raised, and with it the tube and tree.

In order to replant the tree the tube A, which, after the operation above described, projects below the piece $i$, is set into a hole previously prepared for the purpose, and the bolt of said piece slipped upward, so that said piece may be swung out at right angles thereto. The frame, which is now shortened, is dropped down until said piece $i$ constitutes a base therefor, the lever also being lowered to such extent that if its handle, which has heretofore been maintained in a vertical position, be depressed by the operator, its prongs $h'\ h'$ will, during their consequent upward movement, strike against the pins $f\ f$, and so raise the tube from the ground. During this operation the ring $l$, which lies upon the ball of earth within the tube, will remain stationary, as the bolt of its rod $n$ has reached its upper limit in the slots $p\ q$, and it will therefore, as the tube is raised, gradually expel said ball, and with it the tree, leaving the same in proper position within the hole. The tube should be properly sharpened around its lower edge, so that it will readily penetrate the ground, and, in some instances, where the earth is very moist, hammering upon the rods might be dispensed with, and the tube forced into the soil by pressure of the foot.

It will be observed that, during the above-described operation of transplanting, my transplanter may be easily manipulated by grasping the handle of the frame with one hand and the lever-handle with the other.

What I claim, and desire to secure by Letters Patent, is—

1. In a transplanter, the combination of a sliding tubular cutting-case, A, operated by a lever, $h$, a loose ring, $l$, having a standard, $n$, moving in a slot, $p$, and a frame or standard, $c$, all constructed, arranged, and operated, as set forth.

2. In combination with the frame, lever, and tube, constructed to operate as described, the piece $i$, hinged to the lower portion of the frame, and arranged to be bolted, so as to lengthen the frame, or unbolted and swung at right angles thereto, so as to shorten the same, substantially as specified.

In witness whereof I have hereunto set my hand and seal.

TIMOTHY CARROLL. [L. S.]

Witnesses:
   PHAREZ A. CLARK,
   GEORGE W. SILVER.